(12) United States Patent
Bürg et al.

(10) Patent No.: US 7,835,690 B2
(45) Date of Patent: Nov. 16, 2010

(54) METHOD FOR TRANSMITTING AT LEAST ONE INFORMATION DATA RECORD BETWEEN A MOBILE TRIGGER APPARATUS AND AT LEAST ONE FIXED STATION

(75) Inventors: Ulrich Bürg, Offenbach (DE); Lutz P. Richter, Mixdorf (DE)

(73) Assignee: Peiker Acustic GmbH & Co. KG, Friedrichsdorf/TS (DE)

( * ) Notice: Subject to any disclaimer, the term of this patent is extended or adjusted under 35 U.S.C. 154(b) by 822 days.

(21) Appl. No.: 11/727,099

(22) Filed: Mar. 23, 2007

(65) Prior Publication Data
US 2008/0014864 A1    Jan. 17, 2008

(30) Foreign Application Priority Data
Mar. 23, 2006    (EP)    .................................. 06005967

(51) Int. Cl.
    *H04B 7/15*    (2006.01)
(52) U.S. Cl. ...................................... 455/11.1; 455/457
(58) Field of Classification Search ................ 455/11.1, 455/13.1, 41.2, 456.1, 457
    See application file for complete search history.

(56) References Cited

U.S. PATENT DOCUMENTS 6,150,961 A    11/2000    Alewine et al.
2002/0009971 A1*    1/2002    Spratt .......................... 455/41
2002/0030611 A1    3/2002    Nuesser et al.
2003/0187570 A1    10/2003    Impson et al.
2004/0203342 A1*    10/2004    Sibecas et al. ............. 455/11.1
2007/0153737 A1*    7/2007    Singh et al. .................. 370/331

FOREIGN PATENT DOCUMENTS

| DE | 31 21 790 A1 | 12/1982 |
| DE | 102 26 084 A1 | 1/2004 |
| EP | 0 029 201 A1 | 5/1981 |

* cited by examiner

*Primary Examiner*—Tu X Nguyen
(74) *Attorney, Agent, or Firm*—Birch, Stewart, Kolasch & Birch, LLP

(57) ABSTRACT

For the transmission of at least one information data record between a mobile trigger apparatus (9) and at least one fixed station (7a-d), the transmission is effected via an ad hoc network, with a distance between the mobile trigger apparatus (9) and the fixed station (7a-d) being able to be greater than the latter's transmission and reception range by virtue of the transmission then being effected using at least one mobile transmission apparatus (13a/b; 15a-c; 19a/b). The information data record is transmitted to the nearest fixed station (7a-d) directly or via the at least one mobile transmission apparatus (13a/b; 15a-c; 19a/b) or via further mobile transmission apparatuses. The invention is intended to permit data transmission at low transmission and reception power as quickly as possible from a mobile apparatus to a remote fixed station.

16 Claims, 2 Drawing Sheets

METHOD FOR TRANSMITTING AT LEAST ONE INFORMATION DATA RECORD BETWEEN A MOBILE TRIGGER APPARATUS AND AT LEAST ONE FIXED STATION

This Nonprovisional application claims priority under 35 U.S.C. §119(a) on Patent Application No(s). 06 005 967.2 filed in Europe on Mar. 23, 2006, the entire contents of which are hereby incorporated by reference.

TECHNICAL FIELD

The invention relates to a method, an arrangement and an apparatus in the arrangement for transmitting at least one information data record between a mobile trigger apparatus and at least one fixed station.

PRIOR ART

European Patent Application EP 0 029 201 describes a method in which vehicles in the form of a mobile trigger apparatus respectively transmit journey destinations in the form of an information data record to a fixed station, what is known as a guide beacon. The transmitted data are evaluated and a general traffic situation is ascertained therefrom. One drawback in the transmission method in EP 0 029 201 is that it is necessary to use high transmission powers at the fixed station and at the mobile trigger apparatus, and hence data interchange is possible only close to the fixed stations.

ILLUSTRATION OF THE INVENTION

Object

It is an object of the invention to overcome the drawbacks of EP 0 029 201 and to demonstrate a method which can be used to transmit the data in an information data record to a remote, fixed station as quickly as possible at low transmission and reception power.

Manner of Achieving the Object

The object is achieved by transmitting at least one information data record between a mobile trigger apparatus and at least one fixed station by means of transmission via an ad hoc network. In this case, a distance between the mobile trigger apparatus and the fixed station may be greater than the latter's transmission and reception range, since the transmission can be effected using at least one or more mobile transmission apparatuses situated in between which has or have the same transmission/reception range as the mobile trigger apparatus up to a tolerance, with the information data record then being transmitted to the station, particularly to a nearest fixed station, directly or via the at least one mobile transmission apparatus or via further mobile transmission apparatuses.

A mobile apparatus is understood to mean anything which can move. A mobile apparatus is therefore primarily a road vehicle. However, it may also be a horse and carriage, a bicycle, a ship, a walker etc. A mobile trigger apparatus is understood to mean a mobile apparatus which for whatever reason needs to send an information data record. Such a reason may be an accident, particularly a traffic accident, an emergency, a breakdown, a trail of oil on a carriageway, black ice, water on a carriageway etc. A mobile trigger apparatus may simply be a mobile apparatus which has registered something which may be of interest to other mobile apparatuses, particularly ones behind. A mobile trigger apparatus may also be a mobile apparatus which is a potential hazard to other mobile apparatuses, such as a slow-moving heavy goods vehicle or an abandoned vehicle.

An information data record is understood to mean anything transmitted by the mobile trigger apparatus which is firstly intended to warn mobile apparatuses in its relatively close surroundings and/or is intended to be forwarded to a fixed station. The fixed station then reviews the information data record and initiates necessary measures. The necessary measure may be a road block, dispatch of first-aid, operational and/or police vehicles, a general warning announcement etc.

In one preferred variant embodiment, which exploits use of a low transmission and reception power, in particular, transmission and reception units in mobile trigger and transmission apparatuses are of identical or similar design and have the same transmission/reception range as the mobile trigger apparatus up to a tolerance. The mobile trigger apparatus transmits the information data record to the nearest fixed station directly or via at least one further mobile transmission apparatus. The different terms—trigger apparatus and transmission apparatus—have merely been selected in order to be able to demonstrate their different functions.

In an ad hoc network, none of the transmission stations is particularly distinguished. There is also no base station; all stations apart from the fixed station are equivalent. Data interchange between two respective parties is readily possible; as indicated below, however, precautions need to be taken in order to set up a "transmission path" via a plurality of stations. A typical ad hoc network is WirelessLAN (Local Area Network) based on the IEEE 802.11 standard, which is also called "radio LAN". The radio frequencies are in the microwave range in a region of typically 2.4 GHz. In contrast to GSM, which has a transmission power of between 1 and 10 watts, the transmission power for WirelessLAN is 0.1 watt. The transmission range is therefore only a few 100 m. That is to say typically between 30 m and 100 m on open terrain and 80 m in enclosed spaces. In one preferred refinement of the transmission antenna, it is possible to achieve between 100 m and 300 m when there is visual contact. Further information can be found in the informative literature "Sicherheit im Funk-LAN" [Safety in the Radio LAN], Bundesamt für Sicherheit in der Informationstechnik 2003, for example.

A fixed station is understood to mean a station or a location which can pick up data from a mobile trigger apparatus for the purpose of further processing. Fixed stations used may be appropriately equipped emergency telephones at the edge of the road or freeway and, in particular, what are known as hotspots.

The information data record can now be forwarded from one mobile trigger apparatus via a mobile transmission apparatus to other mobile transmission apparatuses, preferably using selection criteria as detailed below, until one of the mobile transmission apparatuses is in the reception range of a fixed station. If there is no mobile transmission apparatus and also no fixed station in the reception range of the mobile apparatus which is currently carrying the information data record, for example, then the data record is taken along with the moving mobile apparatus and is continually transmitted after a prescribed time period until the information data record can be sent. In this way, the information data record is transmitted to the fixed station in the manner of a relay race, but where the "relay racer" does not know when and to whom he can transfer his baton.

It is now preferably possible for any mobile apparatus to have cartographic data available from its respective current surroundings within a prescribed surroundings radius and to have a position finding unit for determining its current location. Position finding can now be carried out using what is known as a GPS (Global Positioning System). In this case, each mobile apparatus contains stored cartographic data. These cartographic data are commercially available, for example on a CD-ROM, and are stored in the mobile apparatus via an interface. Besides the cartographic data for at least one fixed station (normally a multiplicity of fixed stations are stored), what are typically stored among the cartographic data are roads, locations of interest with regard to food, entertainment, shopping facilities, emergency centers etc.

Since each mobile apparatus therefore knows its geographical location and that of the fixed station or of the stations surrounding it and also the cartographic data for the respective surroundings, the mobile trigger apparatus can send an information data record "on its travels" such that it can be transmitted to a, i.e. to the, closest station. In this regard, deliberate use is thus made of mobile apparatuses (=transmission apparatuses) which are situated between the mobile trigger apparatus and the relevant fixed station. Since all mobile apparatuses move, the information data record can only ever be transmitted from one mobile apparatus to another or to the fixed station when it is in the respective reception range.

The information data records can thus be continually transmitted and then, provided that a mobile apparatus enters the transmission range, picked up and forwarded by said mobile apparatus. Preferably, however, each mobile apparatus will be made to emit a short "beacon data record". This "beacon data record" is then received at some time, depending on the density of traffic, by the mobile apparatus which is carrying the information data record. Preferably, this "beacon data record" will contain the current location coordinates and the direction of movement. The mobile apparatus carrying the information data can use the content of the "beacon data record" and the stored location coordinates of the fixed stations to ascertain whether the currently "reporting" mobile transmission apparatus is situated between it and the fixed station. If it is, the information data record is transmitted.

Preferably, the "beacon data record" contains an identifier for the reporting mobile apparatus. Knowledge of this identification then permits the transmitted information data record to be traced back. Transmission of the information data record will preferably also be accompanied by an identifier and the location coordinates of the trigger unit.

If the fixed station is outside of a transmission range for the mobile trigger apparatus then direct radio contact is impossible; it needs to be effected via at least one mobile transmission apparatus in between which is used as a relay station. To optimize this area-by-area radio transmission, it is advantageous if the current position of the respective mobile transmission apparatus relative to the mobile trigger apparatus and also relative to the fixed station is known. Since each mobile apparatus is now able to determine the current position well and easily in connection with its stored cartographic data, each mobile apparatus transmits a "beacon data record" with the current location coordinates, the direction of travel, possibly a carriageway identifier and its identifier at prescribed intervals of time. If road vehicles are involved, the identifier will contain the vehicle registration number, the state identifier, the vehicle type and the vehicle color. Vehicle type and vehicle color are of great benefit for recognition by first-aid vehicles and rescue helicopters, for example. Repetitively transmitting the beacon data record at a frequency of just 2 Hz ought to be sufficient. The beacon data record should be transmitted often enough for beacon data records to be able to be received at least twice within a customary transmission range for the ad hoc network. If the vehicles are traveling at a speed of 50 km/h, for example, then a beacon data record would be transmitted approximately every 3.5 m, and at a speed of 200 km/h it would be transmitted not quite every 28 m, which ought to be sufficient for a transmission range of approximately 100 m. Since all mobile apparatuses have their own timer for transmission, it can be assumed that the beacon data records are transmitted on a subsection of a freeway or a subsection of a traffic route at different times and hence can be received without any problem, since the transmission period is also in the microsecond range and below.

So as firstly not to let the transmission traffic get out of hand and so as also to achieve security in the transmission of the information data record, the fixed station will create and send a response data record. Since the trigger unit has transmitted its identification and also its location coordinate with the information data record, the response data record reaches it without any problem using the method outlined above in a "backward direction".

This response data record is also received by mobile transmission apparatuses involved in transmitting the information data record which, even by these means, do not transmit this information data record any more. If the response data record does not reach the mobile trigger apparatus directly, a mobile transmission apparatus which is situated as far away as possible from the fixed station, or from a mobile transmission apparatus carrying the response data record, in the direction of the mobile trigger apparatus is used, the mobile transmission apparatus naturally still needing to be in the respective reception range.

To achieve the fastest possible transmission of the information data record from the mobile trigger apparatus to the fixed station, mobile transmission apparatuses at a great distance are preferably used which are currently still situated at a safe reception distance, however. Only these mobile transmission apparatuses receive the information data record for forwarding. The reception distance which is currently still safe can now be ascertained by evaluating the beacon data records, with only the respective received transmission field strength needing to be taken into account here in the simplest case when there are a plurality of mobile transmission apparatuses moving in the same direction of travel. To restrict the "radio traffic", the information data record will, where possible, preferably always be forwarded to the mobile transmission apparatus whose beacon data record is received at approximately 25% of the maximum reception power, for example. This selection provides the longest possible transmission paths and, in addition, also permits subsequent transmission of a response data record without this mobile apparatus already having disappeared from the transmission range.

When one of the fixed stations has received an information data record, it transmits a response data record, as indicated above. In addition, the fixed station also sends a station data record to a control center connected to it and can also send a further station data record to a further fixed station connected to it. If used in road traffic, for example, the fixed stations are emergency telephones and hotspots at the edge of the road. In this case, the station receiving the information data record transmits the further station data record to a further station which is situated in the opposite direction to the direction of travel of the mobile trigger apparatus. This further station is then approached by vehicles which are traveling in the direction of the mobile trigger apparatus. These vehicles can now be informed or warned by the further station, depending on the content of the information data record, or can also carry a response data record.

The one or two or more fixed stations, if extended as traffic information devices, for example, can now transmit a response record in a prescribed direction. This is advantageous on freeways, for example, when vehicles on the opposite carriageway also need to be warned. The response signal, which is usually of great importance, can now be emitted at a transmission power which is significantly increased over the transmission power of the mobile apparatuses so that it can also be received by mobile apparatuses which are further away.

The information data record may now have a different structure. It may be designed such that it is to be forwarded only to the fixed station. Such an information data record relates to a faulty vehicle at the edge of the road, for example, which wishes to notify the breakdown service. This information is unimportant to other mobile apparatuses. In this case, further mobile apparatuses are used merely as "relay stations". However, there is also information which is important to all following and possibly also oncoming vehicles, such as a tailback, a trail of oil, a fog bank etc. In this case, although the information data record is forwarded to at least one fixed station, all other mobile apparatuses which are in the surroundings also evaluate this information and present it audibly and/or visually in the mobile apparatus (vehicle) in order to warn the vehicle driver. This information data record is then preferably transmitted repetitively over time, usually with a set time limit. To keep the number of transmitted information data records under control, each further mobile apparatus is now provided with a waiting time delay. Other routable data records can also be limited by virtue of each mobile transmission apparatus transmitting each data record only once if there is a further mobile apparatus in its transmission range.

Whether there is an accident or a breakdown, rapid assistance is generally always required in road traffic. On the basis of a mobile trigger apparatus at the accident location, it is advantageous, where necessary, to use mobile transmission apparatuses for rapid information interchange with a fixed station from which assistance can then be requested. The exact location at which the accident or the breakdown occurred is given firstly by the location coordinates of the fixed station and secondly also by the respective coordinates of the mobile trigger apparatus, which cooperates with a position finding unit, for example a GPS.

The ascertainment of location coordinates is important because approximately 30% of all those involved in accidents cannot give a precise indication of where something has occurred.

The more than ten thousand emergency telephones which already exist on federal freeways already provide a good network of fixed stations which, in addition, are also complemented by a large number of hotspots, which likewise already exist and can be used.

Further variations on embodiments of the invention and the advantages thereof can be found in the text below.

BRIEF DESCRIPTION OF THE DRAWINGS

Examples of the inventive apparatus and of the inventive method are explained in more detail below with reference to drawings, in which.

WAYS OF IMPLEMENTING THE INVENTION

Figure 1:
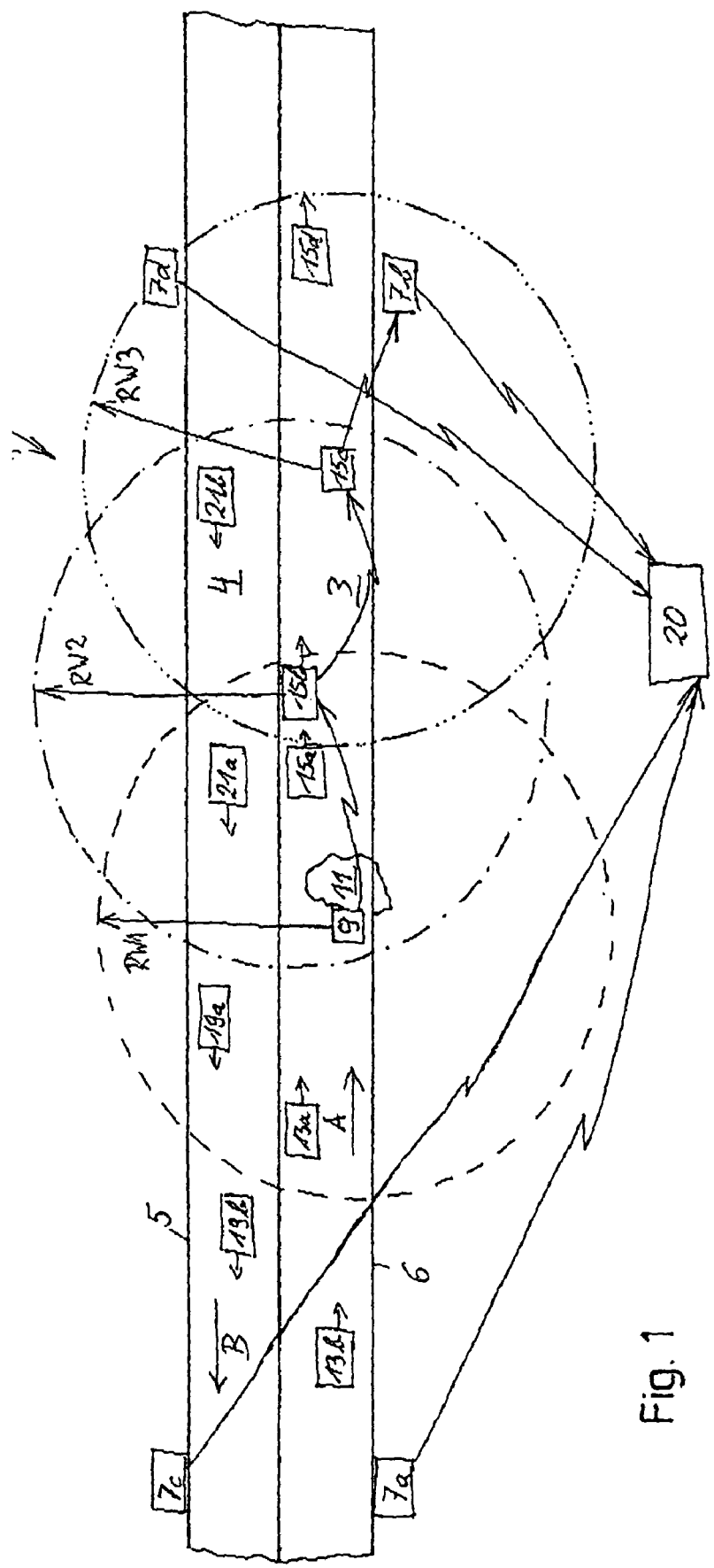
FIG. 1 shows a schematic illustration of a freeway section with a mobile trigger apparatus, a plurality of mobile transmission apparatuses and a plurality of fixed stations to explain the inventive method.

FIG. 1 shows a schematic illustration of a subregion 1 of a freeway as an exemplary embodiment of the invention. On the subregion 1, a plurality of vehicles are moving on one carriageway 3 in a direction of travel A and on the opposite carriageway 4 in a direction of travel B. The speed of the individual vehicles is normally different. At the two edges of the carriageway 5 and 6, there are what are known as emergency telephones 7 in the form of fixed stations at intervals of a few kilometers. One of the vehicles, namely the vehicle 9 on the carriageway 3, is involved in event 11, which is of interest firstly to following vehicles 13a and 13b and also to the whole traffic situation. To draw a distinction over other vehicles, the vehicle 9 is therefore referred to as the "trigger vehicle" 9, since it can be "triggered" by prescribable events 11. An event may, as already set out above, be a vehicle breakdown, an accident, a tailback, weather problems (ice or water on the carriageway, a wall of fog), a poor road condition (holes, uneven ground) etc. For this event 11 an appropriate information data record now needs to be transmitted to at least one of the emergency telephones 7a to 7d and to the following vehicles 13a and 13b. First of all, a description will be given below of transmission of an information data record to one of the emergency telephones 7a to 7d.

Since the data transmission needs to take place as quickly as possible, the information data record to be transmitted is standardized. It contains a vehicle identification (e.g. vehicle number and state identifier, vehicle color and type)

current vehicle location coordinates direction of travel of a vehicle or indication that the vehicle is stationary encoded event description optionally it is also possible to indicate the time of day.

For transmitting an information data record between a mobile trigger apparatus 9 and at least one fixed station, in this case the fixed station 7b, which is arranged at the right-hand edge 6 in the direction of travel A of the mobile trigger apparatus 9, an ad hoc radio network is used. The way in which ad hoc networks work has been outlined in the introduction. The transmission of information data records between a mobile trigger apparatus 9 is set up such that a distance between the mobile trigger apparatus 9 and the, usually, nearest fixed station 7b in the direction of travel A may be greater than said fixed station's transmission and reception range RW. So that transmission beyond the transmission and reception range RW can nevertheless take place, vehicles 15a to 15c acting as mobile transmission apparatuses are used between the mobile trigger apparatus 9 and the fixed station 7b in question. The mobile transmission apparatuses 15a to 15c have the same transmission/reception range RW as the mobile trigger apparatus 9 up to a tolerance. Depending on the volume of traffic and the distance between the fixed station and the mobile trigger apparatus 9, the information data record triggered by an event is now transmitted to the fixed station 7b directly or by the at least one mobile transmission apparatus or via further mobile transmission apparatuses.

Although the mobile trigger apparatus 9 and the mobile transmission apparatuses 15a to 15c perform different functions, their transmission and reception devices are the same or are of similar design with approximately the same transmission and reception power. It is therefore possible for the mobile trigger apparatus 9 to act as a mobile transmission apparatus 13a, 13b, 15a, 15b, 15c, 19a, 19b and for each of the mobile transmission apparatuses also to act independently as mobile trigger apparatuses in another traffic situation. An event 11 cooperating with a mobile trigger apparatus 9 is defined by the position of the fixed station (emergency telephone) receiving the information data record in an approximate area. This approximate location definition normally does not suffice in most cases, however, e.g. in the case of accidents, locating broken-down vehicles etc. Each mobile apparatus (mobile trigger and transmission apparatus) therefore has, as indicated schematically in FIG. 2, cartographic data stored in a memory. These cartographic data are commercially available on CDs. These cartographic data are combined with the current location coordinates received by radio from a position finding unit using GPS, which makes it possible to ascertain the current location accurately down to a few meters. Since each mobile apparatus contains stored cartographic data, it also knows the respective nearest fixed station 7b in the direction of travel.

The mobile trigger apparatus 9 has continuously evaluated the beacon data records from the other mobile apparatuses in its surroundings in the direction of travel and at an appropriately optimum distance from the fixed station and has stored them with continuous overwriting with new data. If an event 11 now affects one of the mobile apparatuses, which now becomes the mobile trigger apparatus 9, then sensors in the mobile apparatus establish what type of effect is involved. The type of effect is transmitted to the data processing unit, which, together with an identification for the mobile apparatus and an identifier for the previously ascertained mobile transmission apparatus, transmits an information data record which is recognized by the recognized mobile transmission apparatus and, with the addition of the latter's identification, is transmitted to the transmission apparatuses which are similarly optimum in terms of distance. Transmission to a fixed station has priority over transmission to a further mobile transmission apparatus. When the information data record has arrived on a fixed station, the latter returns a response data record on the same radio path as the one flagged by the identifiers for the individual mobile apparatus.

It may now occur, with a small flow of traffic, that there is no further mobile transmission apparatus ready to receive in the transmission range of the mobile trigger apparatus or else of a mobile transmission apparatus. If the mobile trigger apparatus cannot send its information data record then this data record is repetitively transmitted until the information data record can be sent. The information data record then always contains the original location coordinates of the location at which the event occurred. If the mobile trigger apparatus is stationary on account of a breakdown or an accident, the information data record is transmitted until a mobile transmission apparatus enters the transmission range. If it has been possible to send the information data record and a response data record has not been received within a prescribed period of time then the information data record is transmitted repetitively again until it is again picked up by another mobile transmission apparatus. In this case, it is assumed that the information data record was lost before reaching the fixed station either on account of a technical transmission fault in the mobile transmission apparatus or on account of a technical fault in the mobile transmission apparatus itself.

It may now also occur that the mobile transmission apparatus cannot, by the time at which the information data record is received, send it to the fixed station or to another mobile transmission, apparatus in its transmission range. In this case, this mobile transmission apparatus carries the information data record until direct transmission to the fixed station or to a mobile transmission apparatus which is closer to the fixed station is possible. The response data record from the fixed station then reaches the mobile trigger apparatus through this "relay-type" data record transfer.

The information data record is always transferred using mobile transmission apparatuses which are moving in their direction of travel toward the fixed station; that is to say in a first priority by means of the mobile transmission apparatuses 15a to 15d to the emergency telephone 7b. To restrict the flow of data and the transmission rates, the data record is, where possible, only ever forwarded to the most distant mobile transmission apparatus which is still in the reception range RW. Each of the electronic units 23 described below therefore contains a discriminator which ascertains the reception levels of the received beacon data records and uses them to ascertain the beacon data record with the weakest level, where the reception level should preferably not be below 25% of the maximum level so that the relevant mobile transmission apparatus should still be within a transmission range which is sufficient for correct data transmission when the response data record arrives. As explained at the outset, a reception level of just 25% of the transmission power has been found to be advantageous; it is also possible to work with other limit values, however. Since the mobile transmission apparatus 15a is now relatively close to the mobile trigger apparatus 9, it receives a reception level of greater than 25% and is therefore not used for transmitting the information data record. However, the mobile transmission apparatus 15b is at approximately 25% of the reception level of the reception range RW1 of the mobile trigger apparatus 9 and therefore evaluates the information data record transmitted by the mobile trigger apparatus and sends it with the same transmission range RW2 up to a tolerance. The transmission mobile 15c is within the transmission range RW2. The mobile apparatus 15d and also the fixed station 7b are outside of the transmission range RW2. The mobile transmission apparatus 15c transmits the received information data record, which can now be received by the fixed station 7b, which is then forwarded to a control center 20. The fixed station sends a response data record to the mobile trigger apparatus 9 via the mobile transmission apparatuses 15c and 15b. It is possible to dispense with an acknowledgement of the response data record by the mobile trigger apparatus 9 because, if a response data record is not received, the mobile trigger apparatus transmits the information data record again after a time period of approximately 10 seconds. With a large density of traffic, the response data record reaches the mobile trigger apparatus 9 in a fraction of a second. A longer time delay arises only if one of the mobile apparatuses has no further mobile apparatuses in the transmission range, and the information data record needs to be carried by the mobile apparatus in question. Each mobile transmission apparatus transmits the received information data record at the same time interval of 10 seconds if no response data record has been received.

Selection of a prescribed reception level allows the inform data record to be forwarded with optimum timing. The information data record is always forwarded, where possible, in the original direction of travel of the mobile trigger apparatus. If this forwarding does not lead to a fixed station in a continuous sequence, however, then the information data record may be transferred to mobile transmission apparatuses 19a and 19b which are moving in the opposite direction B. These mobile transmission apparatuses also only ever transfer the information data record in the direction of travel. That is to say that the mobile transmission apparatus 19a which has received the information data record from the trigger mobile 9 forwards it to the mobile transmission apparatus 19b and this then forwards it to the fixed station 7c. The fixed station 7c then forwards a response data record to the fixed stations 7a and 7d, from which the mobile trigger apparatus 9 then receives a response data record via appropriate mobile transmission apparatuses. This type of transmission of the information and response data records is advantageous whenever a lane is blocked, for example. The fixed stations 7a, 7c and 7d also forward the information data record to the control center 20.

So as not to let the flood of data overflow as a result of repeated transmission of the information and response data records, an electronic unit 23 (described below) in the mobile apparatuses 9, 13a/b, 15a-d, 19a/b and 21a/b may contain a blocking unit 39 which keeps identical data records away from further processing.

Figure 2:
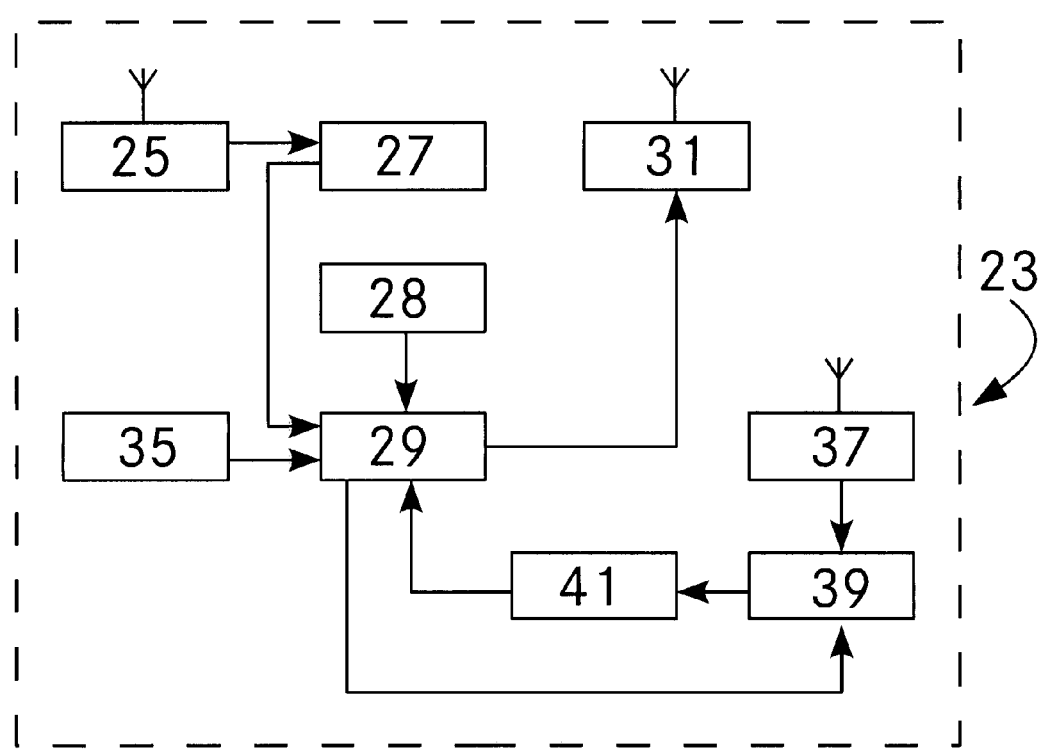
FIG. 2 shows a block diagram of an electronic unit in a mobile trigger or transmission apparatus.

Each mobile apparatus, whether it be the mobile trigger apparatus 9, a mobile transmission apparatus 13a/b or 15a-d behind or in front of this mobile trigger apparatus 9 on the same carriageway 3, or corresponding mobile apparatuses 19a and 19b or 21a and 21a which are on the opposite carriageway 4 and are in the forward or backward direction relative to the mobile trigger apparatus 9, has the same functional electronic unit 23 outlined schematically in FIG. 2. The unit 23 has a GPS unit 25 and a memory unit 27 storing cartographic data. In addition, there is a data processing unit 29 which is connected to the GPS unit and the memory unit 25 and 27 and to an identification unit 28 for signaling purposes and uses the data from both units 25 and 27 to create the beacon data, which are then transmitted using a transmission unit 31 connected to the data processing unit 29 with timing controlled by a timer 33 which is connected to the transmission unit 31. The data processing unit 29 also has various sensors connected to it, FIG. 2 merely showing a single sensor 35 for the sake of simplicity. The sensor data, the identification data from the identification unit 28 and the position of the mobile trigger apparatus 9, created using the GPS unit 25 and stored cartographic data, are used by the data processing unit 29 to form the information data record, which is likewise transmitted by means of the transmission unit 31 under the control of the timer 33. Since the mobile trigger apparatus 9 can also be used as a mobile transmission apparatus and, in addition, also needs to receive the response data record, a reception unit 37 is provided which is connected to the data processing unit 29 for signaling purposes. The signal routing to the data processing unit 29 can be stopped by a blocking unit 39, as is described above. Arranged before or after the blocking unit 33 is a discrimination unit 41. The discrimination unit 41 checks reception levels for the beacon signals from mobile transmission apparatuses for their level and, preferably, also taking into account their respective directions of movement. As already stated above, that beacon data record which is received at the lowest reception level is now selected, with reception levels below a prescribed value no longer being evaluated. A tried and tested prescribed value is 25% of a maximum possible reception level. On account of the relative movements between the mobile transmission apparatuses, the fixed station and the mobile trigger apparatus, which take place in the case of relay-type transmission via a plurality of mobile transmission apparatuses to the fixed station, the response data record must, as far as possible, also be possible via the same transmission path for reasons of time. A reception level of just 25% guarantees a relatively large space between the individual "relay points" for still adequate transmission safety.

The electronic unit has its own power supply (not shown here). The separate power supply is advantageous if, during an accident, the power supply of the other loads is disconnected in order to prevent a vehicle fire, for example.

The beacon data record does not need to be transmitted at one and the same repetition rate for all mobile apparatuses. Since all the mobile apparatuses operate using one and the same standard in the ad hoc network, they all have approximately the same transmission range RW too. A transmitting mobile apparatus then leaves the reception range of a receiving mobile apparatus moving at a different speed in different time periods depending on its speed of movement (speed of travel). So as to have a sufficient time period available for transmitting a data record and a response data record for this data record, the repetition rate of the transmission of the beacon data record can be coupled to the speed of movement. The faster a mobile apparatus is moving, the higher the repetition rate.

On the basis of what has been said above, information data records are transmitted which normally relate only to the mobile trigger apparatus 9. However, there are also events which are of interest to the following or oncoming mobile apparatuses or which should warn these about accident hazards. When such an event has occurred, the information data record is forwarded to a fixed station, as described above; in addition, however, a hazard data record is then created which, in similar fashion to the information data record, contains the position of the event and its identifier and also a hazard identifier. A hazard data record is then received, evaluated, presented and forwarded by all mobile apparatuses (mobile transmission apparatuses) which are within the transmission range, and preferably the respective reception unit which has already received a hazard data record can be blocked for further hazard data records over a prescribed time period, for example corresponding to thirty times the hazard data record repetition time. This is intended to prevent identical hazard data records from being received a plurality of times. The hazard data records are forwarded, in similar fashion to the beacon repetition rate, which may match the speed of movement, at a time interval of 500 µs, for example, with this time shift of 500 µs not being effected on the basis of the receipt of the hazard data record but rather on the basis of the internal timer 33 in the relevant electronic unit 23 of the mobile apparatus in question. The result of this is that the forwarded hazard data records do not all arrive at the same time and hence signal blocking would be impossible.

The invention claimed is:

1. A method for transmitting at least one information data record between a mobile trigger apparatus and at least one fixed station, wherein the transmission is effected via an ad hoc network, and a distance between the mobile trigger apparatus and the fixed station being able to be greater than the latter's transmission and reception range by virtue of the transmission then being effected using at least one mobile transmission apparatus, by virtue of the information data record being transmitted to the station via the at least one mobile transmission apparatus or via a further mobile transmission apparatus, wherein the information data record is transferred using one or more mobile transmission apparatuses which are moving in their direction of travel toward the fixed station and the data record is only forwarded to the most distant mobile transmission apparatus which is in the reception range.

2. The method according to claim 1, wherein the trigger apparatus and all the transmission apparatuses send with the same transmission and reception range up to a manufacturing tolerance.

3. The method according to claim 2, wherein each mobile apparatus stores cartographic data, and from these, using a position finding unit, each mobile apparatus is, for respective current surroundings within a prescribed surroundings radius, provided with the cartographic data for at least one of the fixed stations, preferably for a plurality of the fixed stations, and a trigger signal prompts the mobile trigger apparatus to generate the information data record containing its current location, a trigger identifier and an identifier for the mobile trigger apparatus, the position finding unit of the mobile trigger apparatus to ascertain cartographic data for the mobile transmission apparatus in the surroundings, and then, if one of the mobile transmission apparatuses is situated between the mobile trigger apparatus and the fixed station, it transmits the information data record for forwarding to the fixed station, and this data record is transmitted from this or these mobile transmission apparatuses to the station, particularly to a nearest fixed station, via further mobile transmission apparatuses.

4. The method according to claim 1, wherein each mobile apparatus stores cartographic data, and from these, using a position finding unit, each mobile apparatus is, for respective current surroundings within a prescribed surroundings radius, provided with the cartographic data for at least one of the fixed stations, preferably for a plurality of the fixed stations, and a trigger signal prompts the mobile trigger apparatus to generate the information data record containing its current location, a trigger identifier and an identifier for the mobile trigger apparatus, the position finding unit of the mobile trigger apparatus to ascertain cartographic data for the mobile transmission apparatus in the surroundings, and then, if one of the mobile transmission apparatuses is situated between the mobile trigger apparatus and the fixed station, it transmits the information data record for forwarding to the fixed station, and this data record is transmitted from this or these mobile transmission apparatuses to the station, particularly to a nearest fixed station, via further mobile transmission apparatuses.

5. The method according to claim 1, wherein each mobile apparatus and preferably each station repetitively transmits a beacon data record which contains at least the cartographic data for the current location, the direction of movement of the mobile apparatus and preferably an identifier.

6. The method according to claim 1, wherein the fixed station, having received the information data record, transmits a response data record, containing a preferable identifier for the mobile trigger apparatus, to the mobile trigger apparatus and, if the response data record does not reach the mobile trigger apparatus directly, using a transmission apparatus which is moving toward the mobile trigger apparatus but which is still as far away from the trigger apparatus as possible.

7. The method according to claim 6, wherein the mobile trigger apparatus evaluates the beacon data records from the mobile transmission apparatuses and transmits the information data record, for the purpose of transfer to the fixed station, to a mobile transmission apparatus which is situated between it and the fixed station and which is preferably moving in the direction toward the fixed station.

8. The method according to claim 7, wherein the one or both stations transmit the response data record with a direction code relating to the mobile trigger apparatus, and the response data record is forwarded only by at least one most distant mobile transmission apparatus, which is preferably moving in a direction toward the mobile trigger apparatus.

9. The method according to claim 6, wherein the mobile trigger apparatus checks the beacon data records from the mobile transmission apparatuses in the direction of travel to the station, and a transmission mobile which is furthest away receives a transmission containing the information data record if the fixed station has not transmitted a response data record.

10. The method according to claim 1, wherein following receipt of the information data record the fixed station transmits a station data record to a control center and preferably an appropriate data record to a further fixed station, the further station being situated in the opposite direction from the direction of movement of the mobile trigger apparatus with regard to the first station.

11. The method according to claim 1, wherein the mobile trigger apparatus transmits, preferably at repeat times but in particular with a time limit, a hazard data record to all the mobile apparatuses surrounding it, which process this hazard data record themselves and forward it as a relay point, the hazard data record preferably being forwarded, particularly with a waiting time delay, only by the mobile transmission apparatuses which are situated in the limit region of the maximum transmission range and which, in particular, all switch off the ready-to-receive state of mobile transmission apparatuses not relaying the hazard data record during the waiting time delay.

12. The method according to claim 1, wherein mobile transmission apparatuses forward a freshly received data record only if it differs from a previous received one.

13. A trigger and transmission apparatus in an arrangement, for transmitting at least one information data record between a mobile trigger apparatus and at least one fixed station, wherein a distance between the mobile trigger apparatus and the fixed station may be greater than the latter's transmission and reception range by virtue of there being at least one mobile transmission apparatus situated between the trigger apparatus and the station, and the transmission then being able to be effected by means of the at least one mobile transmission apparatus using an ad hoc network, wherein the mobile transmission apparatus and the mobile trigger apparatus each comprising a discrimination unit, which checks reception levels for the beacon signals from mobile transmission apparatuses for their level and also taking into account their respective directions of movements, the trigger and transmission apparatus having an electronic unit with a transmission unit for transmitting the information data record, a GPS unit, a memory unit for cartographic data, a data processing unit for ascertaining location coordinates for the mobile trigger apparatus from the ascertained data from the GPS unit in connection with the stored cartographic data and for integrating these data as a first data portion into the information data record, at least one sensor for event pickup, where an event from the event pickup can be processed by means of the data processing unit to form a second data portion of the information data record, wherein the electronic unit has an identification unit which identifies the trigger apparatus and which stores at least optical recognition data for the mobile trigger apparatus so that these can be introduced as a third data portion in the information data record, and preferably a reception unit for receiving a further information data record from another mobile trigger apparatus, this second further information data record being able to be transmitted again via the transmission unit.

14. The apparatus according to claim 13, characterized by a timer unit which can initiate transmission of the information data record at a prescribed repetition frequency and preferably, if there is no information data record present, can initiate transmission of a beacon data record which contains at least the current location coordinates and particularly a direction of movement for the apparatus.

15. The apparatus according to claim 13, characterized by a discrimination unit which prompts the data processing unit to transmit an information data record to the apparatus with the lowest reception level.

16. The apparatus according to claim 13, characterized by a blocking unit which blocks a received data record for processing in the data processing section if it arrives within a prescribed time period and does not differ from a data record which has already been received.

* * * * *